3,550,358
FILTER AND SHAKER MEANS THEREFOR
Robert V. McCabe, Pittsburgh, Pa.
(107 Sawyer Drive, Aliquippa, Pa. 15001)
Filed June 3, 1968, Ser. No. 733,964
Int. Cl. B01d 44/04
U.S. Cl. 55—305
8 Claims

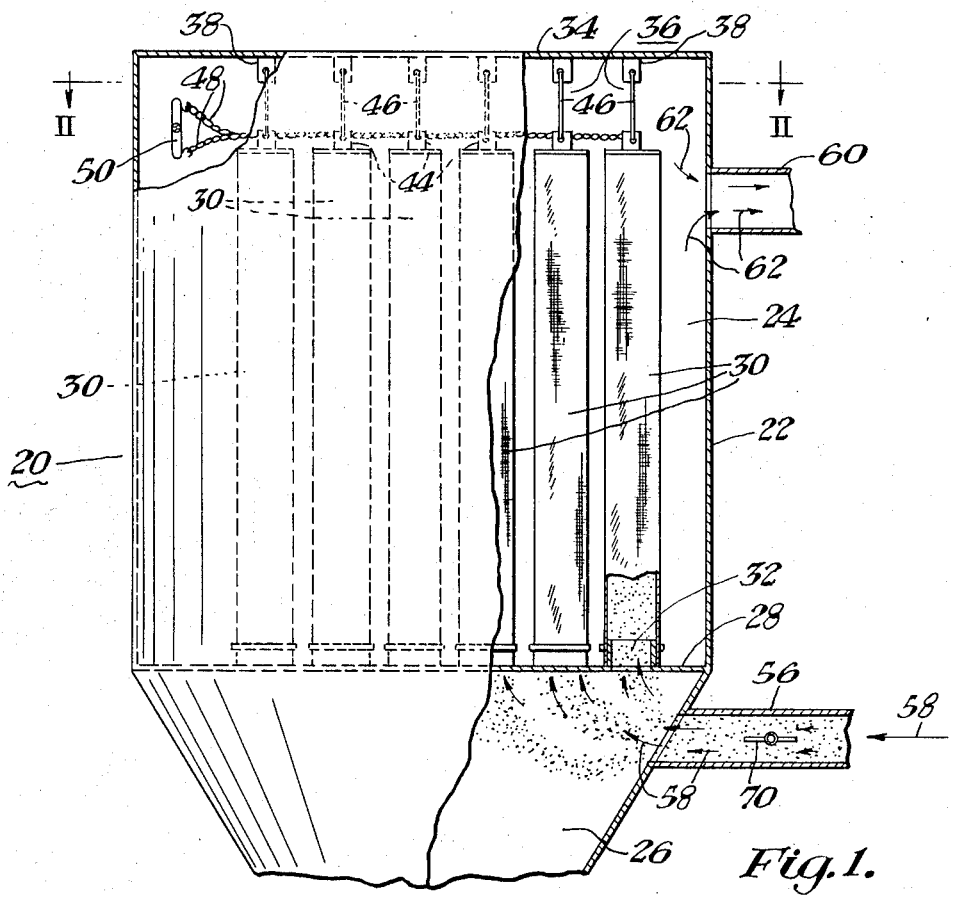
Fig.1.
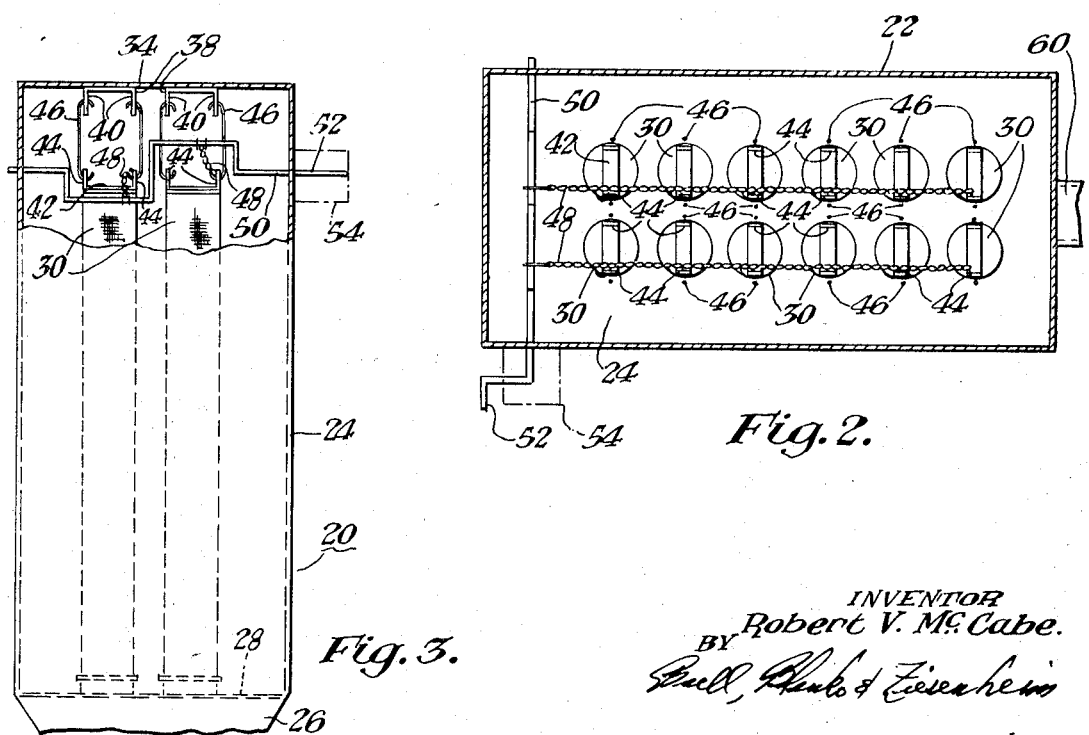
Fig.2.
Fig.3.
INVENTOR
Robert V. McCabe.
BY
HIS ATTORNEYS United States Patent Office 3,550,358
Patented Dec. 29, 1970

ABSTRACT OF THE DISCLOSURE

In a filter unit having at least one suspended pliable filtering member, the combination comprising suspending means for said filtering member, said suspending means including a rigid support secured to an adjacent end portion of said filtering member, a pair of link members engaging said support and a supporting structure of said filter unit for loosely and spacedly suspending said support from said supporting structure, transmission means coupled in off-center fashion to said support, and means for reciprocating said transmission means to impart compound shaking movements to said support and to said filtering member.

---

The present invention relates to a filter construction particularly one employing a plurality of filtering media. The invention is directed primarily to suspending and shaker means for such filtering media.

With increasing problems of air pollution and related difficulties, varied and proliferated types of dust arresters and other filtering devices have come into use. Certain forms of dust arresters and filtering units, however, have long been used in industrial and domestic applications. For many industrial uses, filtering units include a number of filter bags or tubular units constructed from cloth and other filtering media. Unless some means are provided for conveniently and periodically removing accumulated dust and other foreign material, the filtering units rapidly become saturated and useless. Originally, it was necessary to remove the filters at frequent intervals for replacement or cleaning purposes. In many types of filtering devices in use today, this operation continues at the expense of considerable losses in production or other time delays. More commonly, at least in the larger units, means are provided for shaking or vibrating the filters in situ for cleaning purposes.

Although many shaking and vibrating devices have been proposed for periodic cleaning of the filtering media, these have met with only limited success, as complete cleaning of the filters within the filter unit or dust arrester has not been made possible. Periodically, although less often than with solely manual cleaning, the tubular filters must still be removed for complete cleaning or replacement. At other times, the shaking or vibrating means of the prior art must be actuated with such frequency that major losses in production or in operation of the equipment protected by the dust filters still results.

In other approaches to the problem of periodic cleaning of the filtering devices, permanent filtering devices have been replaced with throw-away or discardable filtering units. The use of throw-away filters, however, does not avoid the problem of periodically shutting down the equipment so protected for removal and replacement of the throw-away filters. In many cases, the presence of the usual human element results in operating the equipment provided with throw-away filters far beyond the point at which lessening efficiencies dictate replacement of throw-away filters.

As noted above, a number of arrangements have been proposed for cleaning and for cleaning and suspending various types of filter bags, tubular filters and other suspendable filtering means. In the case of tubular filters, the patents to Schneible 2,014,298; Labbe 3,375,641; Roberts et al. 2,854,091; and Liel 3,030,636 are of interest. The Roberts et al. and Labbe patents disclose various means for vibrating or shaking filter tubes by varying gas or air pressures. In the Liel arrangements, the filter tubes are reverse flushed by air nozzle means passed longitudinally over the tubular filters. Schneible on the other hand provides means for suspending a plurality of tubular or bag filters and for reversibly rotating the suspension means so that the upper ends of the bags are twisted slightly about their longitudinal axes.

In all of the prior art mentioned thus far, the filter bags or tubes are not shaken sufficiently or properly for the complete removal of deposited dust or other foreign material. Thus, known filter cleaning means must be operated with undue frequency and the filtering unit never thereafter attains its original efficiency in dust and smoke arrestment.

Related filter cleaning devices have been disclosed in the United States patents to Kroll 3,233,274; Peabody et al. 3,160,908 and Hallstrom 3,055,161. In each of these filter cleaners, the filtering material is subjected only to movement or vibration in its longitudinal direction. Although some cleaning of the filtering material is evident, the efficiency of the cleaning devices in restoring the filtering unit to its original efficiency is seriously impaired.

I have discovered that the most efficacious method and means for cleaning tubular filters or bags and other suspendible filtering media involves the motions of twisting and/or stretching accompanied by shaking motions of the serpentine or sinusoidal variety. Accordingly, I provide novel means and methods for periodically imposing these combinations of cleaning motions upon tubular filters or other filter media of a filter construction. Insofar as I am aware the prior art, as typified by the aforementioned references, has not provided any such means or methods for subjecting filtering media to such combinations of cleaning motions. Unless the filtering media are subjected to these novel combinations of motions, the filtering media cannot be thoroughly cleaned without removing them from the filter unit.

I accomplish these desirable results by providing in a filter unit having at least one suspended pliable filtering member, the combination comprising suspending means for said filtering member, said suspending means including a rigid support secured to an adjacent end portion of said filtering member, a pair of link members engaging said support and a supporting structure of said filter unit for loosely and spacedly suspending said support from said supporting structure, transmission means coupled in off-center fashion to said support, and means for reciprocating said transmission means to impart compound shaking movements to said support and to said filtering member.

I also desirably provide a similar filtering unit wherein a support is provided for each of said filtering members, and said movement imparting means produce twisting, whipping and longitudinal stretching motions in said filtering members.

I also desirably provide in a filter unit having a plurality of suspended pliable filtering members, the combination comprising a number of suspending means for said filtering members, each of said suspending means including a rigid support secured to an adjacent end portion of at least one of said filtering members, a pair of link members engaging said support and a supporting structure of said filter unit, for loosely and spacedly suspending said support from said supporting structure, transmission means coupled in off-center fashion to each of said supports, and means for reciprocating said transmission means to impart compound shaking movements to said supports and to said filtering members.

I also desirably provide a similar filtering unit wherein said support is joined to an adjacent pair of filtering members, said support comprising a pair of spaced supporting members, each of which is joined to an associated one of said filtering members and to an associated one of said link members, and a cross member is joined rigidly to said supporting members, said cross member extending transversely of the reciprocatory direction of said transmission means.

I also desirably provide a filtering unit comprising a casing, a partition in said casing dividing said casing into outlet and inlet plenums, a plurality of tubular filtering members having open end portions joined respectively to aperture means on said partition, a number of suspending means for the other closed end portions of said tubular members, each of said suspending means including a rigid support secured to an adjacent end portion of at least one of said bags, a pair of link members loosely and spacedly engaged to said support and to a wall structure of said casing, transmission means coupled in off-center fashion to said supports, and means for reciprocating said transmission means to impart a compound shaking movement to said supports, and inlet and outlet conduit means coupled respectively and in communication with said inlet and outlet plenums.

I also desirably provide a means for cleaning filtering media, said means comprising means for simultaneously elongating said filtering media, and imparting a sinusoidal shaking motion thereto.

During the foregoing discussion, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

In the accompanying drawings I have shown certain presently preferred embodiments of the invention wherein:

FIG. 1 is a front elevational view, partially broken away, of a filter unit arranged in accordance with my invention and employing my novel suspending and shaking means for the filtering media thereof;

FIG. 2 is a cross sectional view of the filter unit shown in FIG. 1 and taken along reference line II—II thereof;

FIG. 3 is an end elevational view of the apparatus as shown in FIG. 1;

Figure 2A:
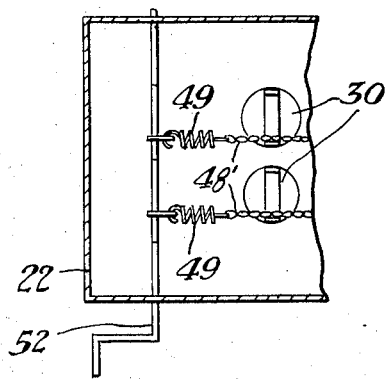
FIGS. 2A and 2B are partial views corresponding to the left and right end portions of FIG. 2 and showing modifications of the transmission means.

Referring now to FIGS. 1–3 of the drawings, the exemplary form of my invention shown therein comprises a filter unit 20 having a casing 22 separated into upper and lower plenums 24, 26 by means of partition 28 and a plurality of filtering members, in this example, the tubular filters 30. The upper plenum can be open as noted below. The lower, open ends of the tubular filters 30 are secured in a conventional manner to the partition 28 at its aperture means 32. The upper, closed ends of the tubular filters 30 are suspended, in this example, from the top wall 34 of the filter casing 22 by means of my novel suspending means 36.

It will be understood that multiple upper and lower plenum chambers (not shown) within a single casing 22 can be used in parallel for continuous operation when one set of chambers are shut off for bag cleaning purposes. Two or more independent filter units 20 can be employed alternatively for this purpose. On the other hand, the sets of chambers or the independent units can be operated in series for certain cleaning applications.

In this arrangement of the invention each of the suspending means 36 includes an inverted U or channel bracket 38 secured to the top casing wall 34 and including a pair of depending, apertured legs 40. Each of the filter tubes 30 is provided at its upper end with a reinforcing ring or similar rigid support 42 having a pair of apertured, upstanding brackets 44 in diametric opposition thereon. Other two-point securance means can be substituted for the brackets 38 or 44. The upper end of each tubular filter 30 is loosely and spacedly suspended from the casing wall 34, in particular its associated channel bracket 38, by a pair of link members, taking the form here, of double ended hooks 46, the ends of which are respectively inserted into the apertures of the aforementioned brackets 40, 44. The upper ends of the filtering tubes 30 are therefore supported for compound or combinative movement including a number of motions imparted by their associated suspending means 36 in combination with actuating means described below.

In further accordance with my invention, actuating means are provided for imparting movement to the suspending means 36 and hence to the filter members 30. The arrangement of such actuating means together with the structure of the filtering media suspending means 36 translates the aforesaid movement into the aforementioned combinative motions which are effective in the complete cleaning of the tubular filters 30.

One form of such actuating means includes transmission means such as chains 48 or other elongated or linear transmission members, coupled in this example to one of the ring brackets 44 of each tubular filter 30. In the illustrated arrangement, as better shown in FIG. 2, a chain 48 desirably is provided for each row of tubular filters 30. As further evident from FIG. 2 a chain 48 is connected to the side of each filter suspending means 36.

The actuating means further include suitable driving means provided in accordance with my invention for reciprocating the chains 48. In this example, such driving means includes hand-operated crank 50, which can be shaped as better shown in FIG. 3 to impart rectilinear reciprocatory movements to the chains 48. For balanced force application to the filtering unit 20, the chains 48 desirably are reciprocated through substantially equal distances but in opposite directions. The crank 50 can be provided with a hand operator 52, or alternatively the crank 50 can be powered-operated as by an electric motor denoted by chain outline 54.

Figure 2B:
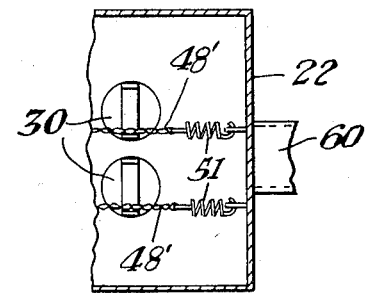

A smoother operation of the chains 48 is assured by the use of coil springs 49 or the like at the points of connection between the chains 48 and the crank 50, as shown in FIG. 2A. Alternatively, and for somewhat the same purposes the opposite ends of the chains 48' can be connected to the adjacent casing wall or other support structure 22 through springs 51 as shown in FIG. 2B. The latter springs 51 also tend to increase the whipping forces (described below) imparted to the bags 30.

In operation of the filtering unit 20, as better shown in FIG. 1, dust laden air or industrial furnace exhaust or the like enter inlet conduit 56 as denoted by flow arrows 58. From the lower plenum 26, the contaminated air or gases pass upwardly through aperture means 32 into the lower open ends of tubular filters 30. Cleaned air or gas passes outwardly through the tubular sidewalls of the filters 30 and into the upper plenum 24 from which clean gas or air exits through conduit 60 as denoted by flow arrows 62. When operated in this fashion, dust or other foreign material is deposited on the inside surfaces of the filter bags 30. As this occurs, part of the dust or other foreign matter becomes lodged in the interstices of the filter cloth or other material comprising the tubular filters 30. It will be apparent that the upper plenum chamber 24 need no be totally enclosed and duct 60 can be eliminated in certain applications, e.g., where filtered air is exhausted directly to the atmosphere.

When ordinary shaking motions are imparted to the filter bags 30, the dust or other foreign material lodged in the interstices of the filter bags is seldom completely removed. The material thus embedded in the filter can cause a binding, blinding or clogging of the cloth or other filter material which reduces the rate of filtering. In extreme cases, there is a total blinding of the filtering media. My novel filter structure is capable of such movement that the embedded dust and other particles are largely removed from the interstices of the filtering media.

As shown in FIGS. 4–7, when the crank 50 is rotated in either direction, as denoted by arrow 64, a compound shaking movement is imparted to the upper ends of each of the filter bags 30. The components of such compound movement are determined largely by the character of the bag suspension means 36 and their off-center connection to the chains 48 or other transmission means. At least one component of this compound movement is transferred down the lengths of the filter bags 30 causing dust and other foreign material 66 to fall from the lower open ends of the filter bags 30 as denoted by arrows 68. A dump trap or other disposal means (not shown) can be furnished at the bottom of the lower plenum 26 for periodic removal of the dislodged dust and other accumulated foreign matter. At such times damper 70 in inlet conduit 56 can be closed.

Figure 7:
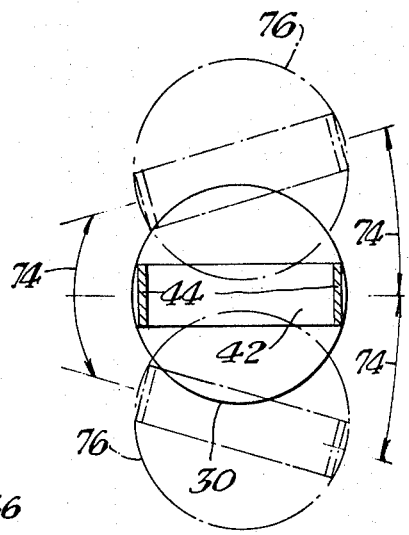
FIG. 7 is a top plan view of one of the tubular filters shown in the preceding figures and illustrating one component of the combinative motion imparted thereto.
Figures 5, 6, 8:
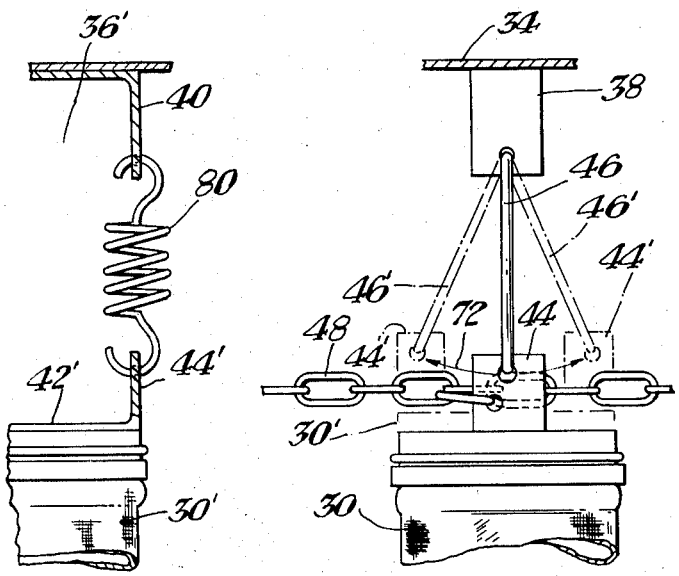
FIG. 5 is an enlarged partial front elevational view of one of the suspending means and associated components shown in the preceding figures.
FIG. 6 is a right side elevational view of the apparatus as shown in FIG. 5.
FIG. 8 is a left side elevational view otherwise similar to FIG. 6 but illustrating another form of my novel filter suspending means.

As better shown in FIG. 5 one component of the aforesaid compound shaking movement is a limited rotational motion of the upper bag ends about the longitudinal axes of the bags as denoted by arrow 72. At the extremes of this rotational or twisting motion, the suspending hooks 46 are angularly displaced to their respective chain outline positions 46' of FIG. 5. This displacement stretches the tubular bags 30 by displacing their upper ends toward the upper casing wall 34 to their chain outline positions 30'. Thus, the twisting component of such movement also alternately stretches and relaxes the tubular bags as the chains 48 are reciprocated. This longitudinal bag motion is accompanied by reversing relative tortional motion between the movably suspended upper ends of the bags 30 and their fixed lower ends as denoted by arrows 74 in FIG. 7.

In addition to the aforementioned longitudinal and twisting or tortional motions imparted to the filtering bags 30, a whipping motion, as better shown in FIG. 7, is imparted to the upper ends of the bags 30 by the off-center connection between the suspending means 36 and the transmission chains 48. This whipping motion is enhanced, as delineated by chain outlines 76 (FIG. 7), by the two-point, loose connection, including hooks 46, of the suspending means 36. Thus, the loose engagements of the hooks 46 and the associated brackets 40, 44 both permit and limit the whipping motion.

Figure 4:
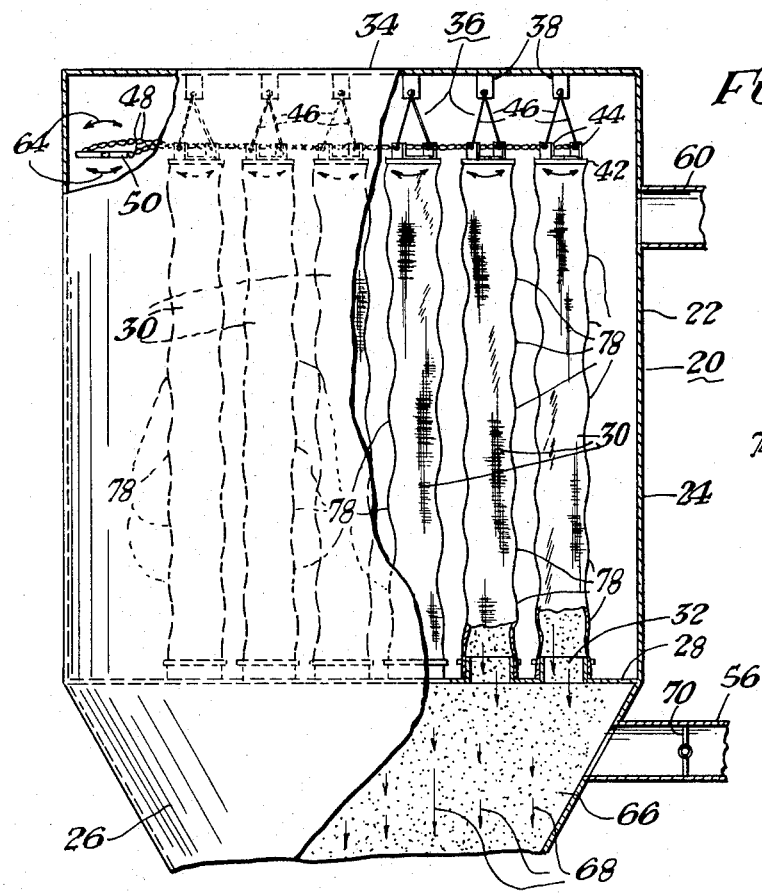
FIG. 4 is a view similar to FIG. 1 of a portion of the filter unit and illustrating the operation of my novel suspending and shaking means.

When the crank 50 is rotated, the aforementioned whipping motion imparts a serpentine or sinusoidal motion to the bags 30, which travels down the length thereof as denoted by reference characters 78 (FIG. 4). It will be understood, of course, that the amplitude of the sinusoidal motions will assume a maximum value for a given length, size, and material of the bags, and will depend additionally upon the rotational speed of the crank 50. The filter members 30 are, of course sufficiently pliable for this purpose. The sinusoidal motions 78 ensure an adequate shaking movement along the entire lengths of the filters 30. This combination of twisting, stretching, longitudinal and transverse whipping and resultant serpentine motions imparted to the tubular filters or bags 30 has been found to be most efficaceous in removing the clogging or blinding particles from the interstices of the filter cloth or other filtering material.

As better shown in FIG. 8 of the drawings, where similar reference characters with primed accents refer to similar structures of the preceding figures, the aforementioned whipping motion can be enhanced by replacing the hooks or link members 46 of the preceding figures by a pair of link members or springs 80 each of which is hooked or otherwise loosely secured or pivoted at each end to one of the associated brackets 40, 44. As the upper ends of the bags 30 are twisted (FIG. 5) the stored energies of the springs 80 increase the whipping action of the transmission 48 and suspending means 36. Desirably, the strength of the springs 80 is such that a limited amount of elongation still is imparted to the bags 30 when twisted to ensure a stretching action.

Figure 9:
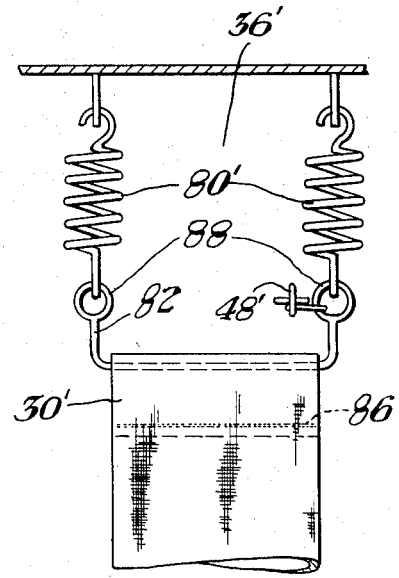
FIGS. 9 and 9A are partial side and front elevational views respectively of still another form of my novel filter suspending means.
Figure 9A:
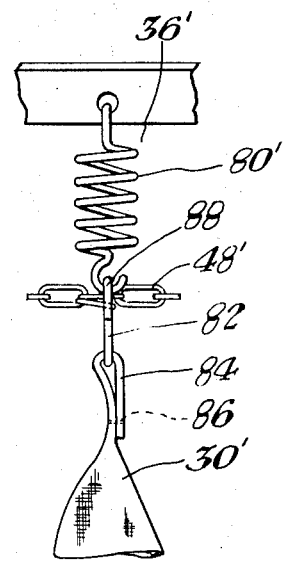

A similar arrangement is illustrated in FIGS. 9 and 9A of the drawings wherein the bag supporting ring of the preceding figures is replaced by supporting bar 82. In this arrangement the upper ends of the filter bags 30 are closed more conveniently by flattening and folding over the bar 82 as denoted by reference character 84, in FIG. 9A. The folded end portion can be stitched or otherwise secured as denoted by the reference character 86.

The supporting bar 82 is furnished at each end with an upstanding eyelet portion 88 to which one of the springs 80' is attached. A chain or similar linear transmission 48' is attached to one end only of the bar 82, with the result that the suspending means 36' operates in a fashion similar to that shown in FIG. 8 but described in operative detail with reference to FIGS. 4–7.

Figure 10:
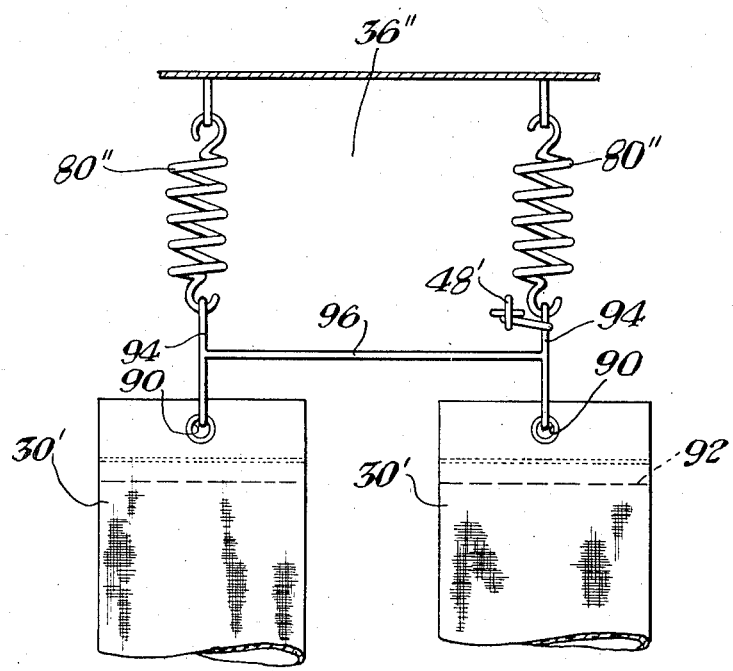
FIGS. 10 and 10A are similar views of still another form of my novel filter suspending means.
Figure 10A:
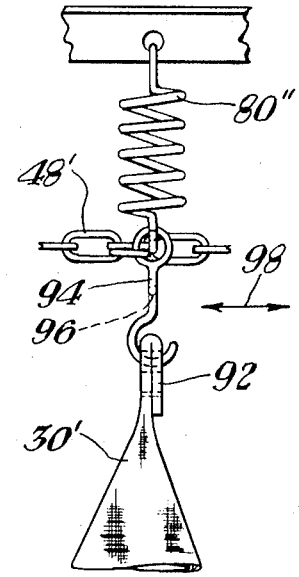

Another form of my novel bag suspending means 36" is shown in FIGS. 10 and 10A of the drawings. In this arrangement of my invention, each of the filter bags 30' is suspended from a single spring 80". For this purpose each bag is provided with a central eyelet 90 in its upper folded portion 92 to which is secured a double ended hook or link 94. The hooks 94 of each adjacent pair of filter bags 30' are rigidly joined to cross member 96 so that the cross member 96 and associated links 94 form a common and rigid support for each adjacent pair of bags 30'. Each cross member preferably extends tranversely of the transmission chain 48', as better shown in FIG. 10A. The chain 48', however, is secured off-center of the support 94–96 in this example to only one of the double ended hooks 94. Accordingly, reciprocation of the chain 48' or other transmission as denoted by arrow 98 imparts both whipping and longitudinal motions to the filter bags 30'. This whipping motion is efficacious in producing the serpentine or sinusoidal shaking of the bags 30' in the manner described above in connection with FIGS. 4–7 of the drawings. Thus, at least a major proportion of the embedded foreign material in the filtering media is removed. Although my novel suspension means 36" does not impart a pronounced twisting component to the upper ends of the bags, the greater distance between the suspensional points of the suspension means 36' and the interaction between the swinging upper ends of the bags 30' resulting from the rigid connection or support 94–96 produces a more pronounced whip.

In the arrangements of my suspension means 36' or 36" of FIGS. 9, 9A and FIGS. 10, 10A, it will be understood of course that the springs 80' or 80" can be replaced with the double ended hooks or link members 46 of FIGS. 1–7 of the drawings.

Figure 11:
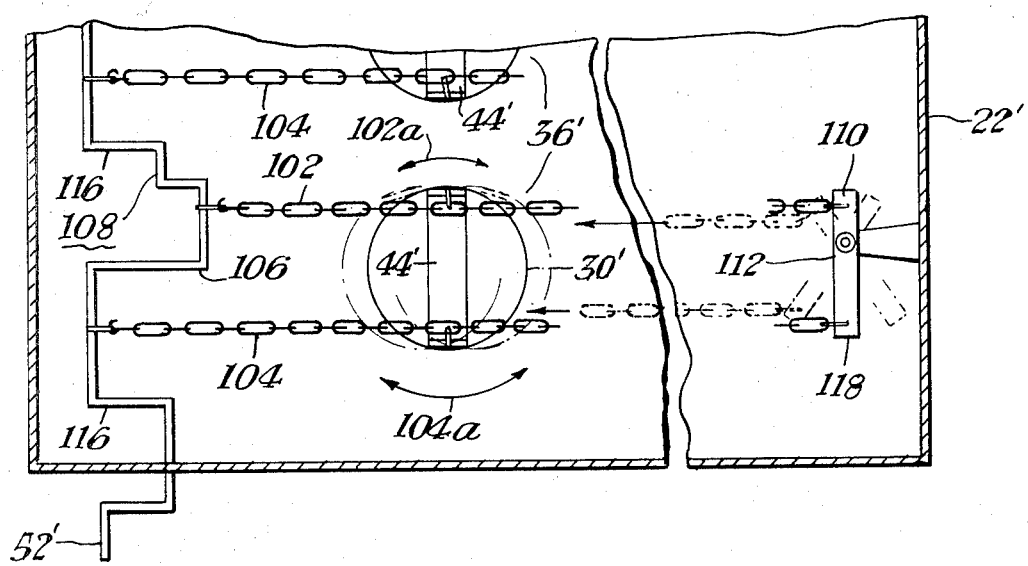
FIG. 11 is a view similar to FIG. 2 showing still another form of my novel transmission and suspending means.

Referring now to FIG. 11 of the drawings, another form of my novel transmission means is denoted generally by reference character 100. Those components of FIG. 11 which are similar to components of the preceding figures are denoted by similar reference characters with primed accents. In the arrangement of FIG. 11 both sides of each bag suspension means 36' are driven positively by a pair of chains 102, 104 of similar linear transmission means connected respectively to brackets 44'. Chain 102 is connected, in this example, to shorter crank arm 106 of crank 108 and to a shorter moment arm 110 of pivoted lever 112. The crank 110 is rotatably mounted adjacent one side of the casing 22' in much the same manner as described in connection with crank 50 of FIGS. 1–4. The pivoted lever 112 is pivotally mounted on bracket 114 secured in this example to the opposite side of casing 22'. Chain 104 is similarly coupled but is connected to a longer crank arm 116 of the crank 108 and to longer moment arm 118 of the pivoted lever 112.

With the arrangement just described, rotation of the crank handle 52' causes equal and opposite rectilinear driving motions to be applied to each side of each bag 30', i.e., to each bracket 44' thereof as denoted by double headed arrows 102a and 104a respectively. This results in more positive longitudinal displacements of the bags 30' of FIG. 11 in somewhat the same manner as illustrated and described above with reference to FIG. 5. These positive longitudinal and rotational movements are adequate in many cases for proper cleaning of the bags 30'. However, in other applications the arrangement of FIG. 11 by virtue of the differing lengths of crank arms 106, 116 imposes also the whipping motions, described in connection with FIG. 7 as designated by the differing lengths of the arrows 102a, 104a. As noted previously, this whipping motion is translated up and down the lengths of the bags in the form of sinusoidal and serpentine motions as described in connection with FIG. 4. The whipping motions of FIG. 11 result, however, from the equal and opposite driving motions of chain 102 acting through a different lateral bag displacement than the equal and opposite motions produced by chain 104.

From the foregoing description of FIG. 11, it will be seen that my novel transmission and suspending means thereof can be varied to impart equal and opposite motions to diametrically opposite sides of bags 30', in which case the lengths of the crank arms 106, 116 will be equal as will also be the lengths of the moment arms 110, 118 of the pivoted lever 112. In a preferred form of the invention as shown in FIG. 11, however, the crank arms 106, 116 and the moment arms 110, 118 are unequal in length as shown for the purpose of incorporating also the aforedescribed whipping motion.

It is also contemplated that each side of each bag 30' can be driven positively in only one direction, as by elimination of the pivoted lever 112. In the latter case, the crank arms 106, 116 of the crank 108 can be equal as each pull of the chain 102, 104 will impart a whipping motion to the opposite side or bracket 44' of the associated bag 30'.

In the operation of the FIG. 11 embodiment, or of any of its described variations, it is noteworthy that the bags 30' are not rotated or angularly displaced about their center. In the illustrated form eccentric rotation or whipping motion is caused by unequal movements of the chains 102, 104. Some eccentricity of movement, or whip, will still result where the crank arms 106, 116 are equal (even with use of a centrally pivoted lever), as with inevitable slack in the chains 102, 104 or other transmission members will prevent simultaneous applications of rotational forces to the bags 30'.

With the particular combination of motions imparted to the filter bags 30 or 30' by my novel suspension and shaking means for filtering media, a much more nearly complete cleaning of the filtering media is accomplished than has been heretofore possible. While I have shown and described certain presently preferred embodiments of the invention it is to be distinctly understood that the invention is not limited thereto but may be variously embodied and practiced within the scope of the following claims:

I claim:

1. A filtering unit comprising a supporting structure, a plurality of elongated flexible filter bags, means for spacedly suspending said bags from said supporting structure, each of said suspending means including a support member and a pair of link members spacedly coupled thereto, said support members engaging and supporting closed end portions of said bags respectively, said support members being secured to and extending transversely of said end portions respectively, the pairs of said link members being loosely connected to said support members respectively and to said supporting structure so that each of said support members and the bag end portion attached thereto are spacedly suspended from said supporting structure for swinging and twisting movements independently of others of said support members, an elongated transmission member coupled loosely and eccentrically to each of said support members at a location adjacent one of the link members connected thereto and adjacent peripheries of said bag members respectively, and means for reciprocating said transmission member to impart said movements to said support members and to said filter bags, said filtering unit including flow passage means coupled in communication with each of the other end portions of said bags for flowing therethrough a fluid to be filtered.

2. The combination according to claim 1 wherein said filter bags are arranged in at least two rows thereof, a second transmission member is provided, said transmission members being coupled respectively in tandem to the support members of said rows, and said reciprocating means being shaped for imparting opposite but substantially equal rectilinear movements to said transmission members respectively.

3. The combination according to claim 1 wherein a second elongated transmission member is provided, said transmission members each being coupled to each of said support members at positions respectively adjacent the pair of link members connected thereto, and said reciprocating means being shaped to impart opposite but unequal rectilinear movements respectively to said transmission members and to the respective end portions of each of said support members.

4. The combination according to claim 1 wherein said transmission member is coupled in tandem to said support members, and said reciprocating means impart substantially rectilinear movements to said transmission member.

5. The combination according to claim 4 wherein said transmission member is flexible, and spring means are connected to said transmission member and to said supporting structure, said spring means are being connected to that end of said transmission member which is opposite from said reciprocating means.

6. The combination according to claim 1 wherein each of said link members includes pivot means adjacent each end thereof for pivotally connecting the pairs of link members to said support members respectively and to said supporting structure.

7. The combination according to claim 6 wherein said link members each include a spring portion disposed intermediately of the associated pivot means.

8. A filtering unit comprising a supporting structure, a plurality of elongated flexible filter bags arranged in rows, means for spacedly suspending transverse pairs of said bags from said supporting structure, each of said suspending means including an elongated support member joined adjacent its ends respectively to each of an associated pair of said filter bags and a pair of link members spacedly coupled to said support member, each of said support members engaging and supporting closed end portions of an associated pair of said pairs of bags respectively, said support members being secured to and extending transversely of the pairs of said bag end portions respectively, the pairs of said link members being loosely connected respectively to said support members adjacent the ends thereof and to said supporting structure so that each of said support members and the pair of bag end portions connected thereto are spacedly suspended from said supporting structure for swinging and twisting movements independently of others of said support members, an elongated transmission member coupled loosely and eccentrically to each of said support members at a location adjacent the connection of one of said link members thereto and adjacent the end of the respective support member, and means for reciprocating said transmission member to impart said movements to said support members and to said filter bags, said unit including flow passage means coupled in communication with the other end portions of said bags for flowing therethrough a fluid to be filtered.

References Cited

UNITED STATES PATENTS

| | | | |
|---|---|---|---|
| 729,492 | 5/1903 | Hannay | 55—305 |
| 1,030,477 | 6/1912 | Meier | 55—304 |
| 1,388,294 | 8/1921 | Pederson | 55—304 |
| 1,747,131 | 2/1930 | Parsons | 55—304 |
| 1,835,093 | 12/1931 | Ruemelin | 55—305 |
| 2,014,298 | 9/1935 | Schneible | 55—341 |
| 2,057,578 | 10/1936 | Kleissler | 55—305 |
| 2,137,254 | 11/1938 | Turnbull | 55—304 |
| 2,350,011 | 5/1944 | Black | 55—304 |
| 2,732,030 | 1/1956 | Dorfan | 55—304 |
| 2,952,332 | 9/1960 | Metro | 55—341 |
| 3,097,939 | 7/1963 | Schneider et al. | 55—304 |
| 1,496,666 | 6/1924 | Fatscher | 55—300 |

FOREIGN PATENTS

| | | | |
|---|---|---|---|
| 845,113 | 8/1960 | Great Britain | 55—304 |
| 1,077,085 | 4/1954 | France | 55—305 |

FRANK W. LUTTER, Primary Examiner

B. NOZICK, Assistant Examiner

U.S. Cl. X.R.

55—341, 378